March 17, 1970   F. A. E. PORSCHE   3,501,094
SPEED RESPONSIVE MOTOR VEHICLE HEATING
Filed July 25, 1967   2 Sheets-Sheet 2
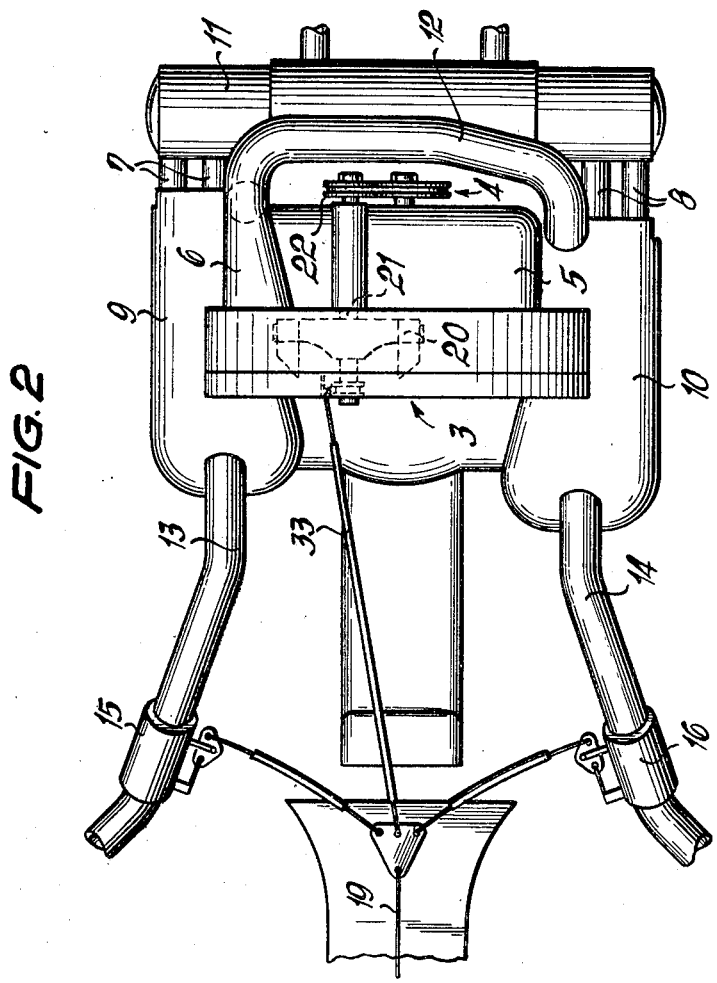
INVENTOR
Ferdinand Anton Ernst PORSCHE
BY Dicke & Craig
ATTORNEYS

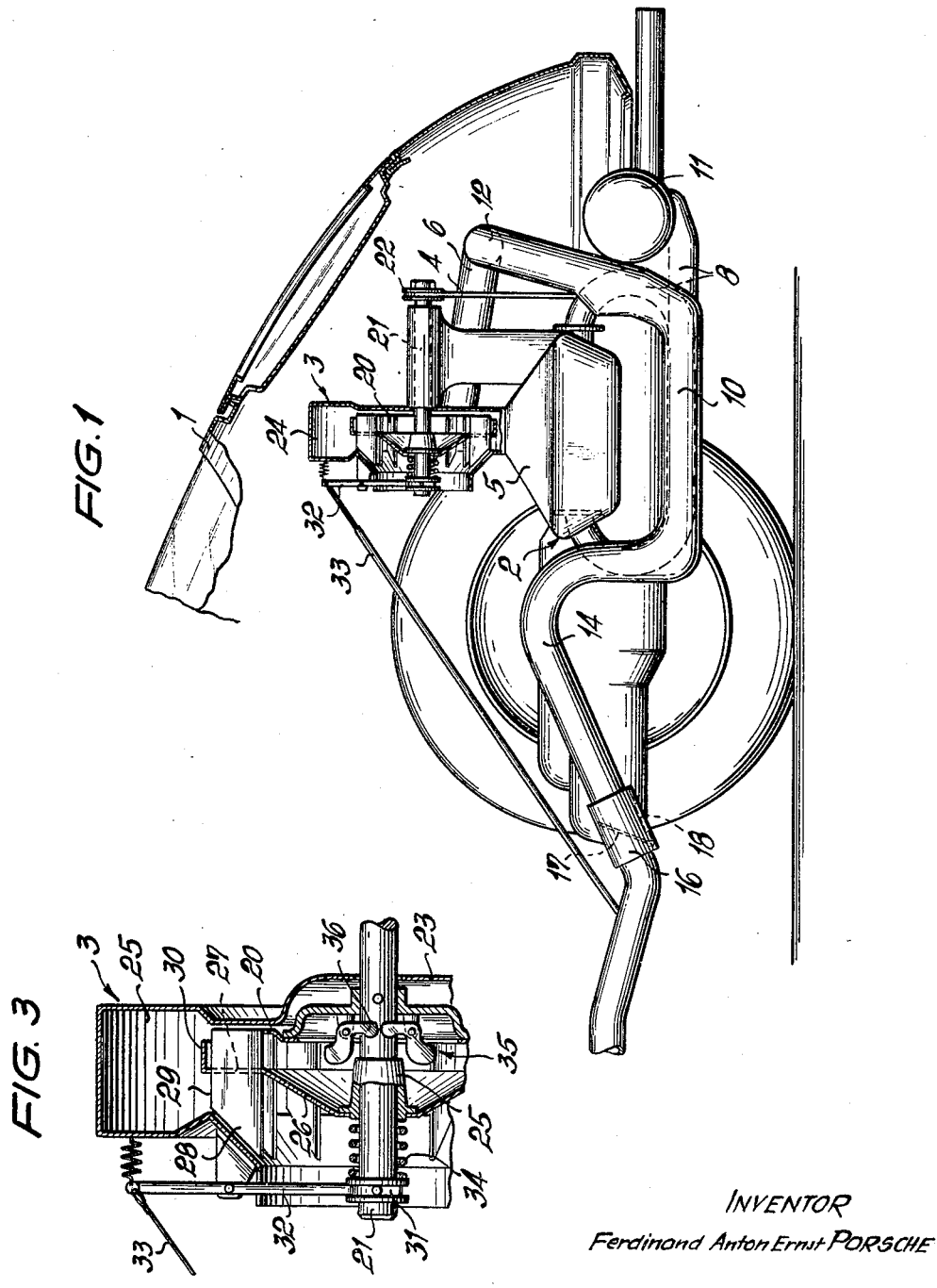

United States Patent Office 3,501,094
Patented Mar. 17, 1970

3,501,094
SPEED RESPONSIVE MOTOR VEHICLE HEATING
Ferdinand Anton Ernst Porsche, Stuttgart, Germany, assignor to Firma Porsche, Stuttgart, Germany
Filed July 25, 1967, Ser. No. 655,924
Claims priority, application Germany, July 29, 1966,
1,580,548
Int. Cl. B60h *1/02;* A01k *31/20*
U.S. Cl. 237—12.3         11 Claims

ABSTRACT OF THE DISCLOSURE

A blower for supplying cooling air to an-cooled engine and heating air to the passenger compartment through a heat exchanger. The flow of the heated air to the passenger compartment is controlled by means of a valve actuated from the passenger compartment and the quantity of air delivered by the blower is controlled by a shroud that is shiftable simultaneously with actuation of the valve to control the effective width of the blower blades. A shifting control movement of the shroud is superimposed on the valve responsive control movement by means of a centrifugal governor so that the quantity of air delivered by the blower is also controlled by the speed of the blower; the two controlled shifting movements are superimposed by means of a spring in the drive train of the valve actuation responsive shifting.

BACKGROUND OF THE INVENTION

Heating arrangements for motor vehicles with an air-cooled internal combustion engine having a cooling blower supplying fresh cooling air to the engine cylinders as well as heating air to the passenger compartment of the motor vehicle by way of one or more heat exchangers have disadvangtages in regard to controlling the amount of heating air supplied by means of suitable linkages. With this type of arrangement, the heating air flow is soley dependent upon the rotational speed of the cooling air blower for each particular setting of the linkage; this has the disadvantage that during low speed driving or idling on the internal combustion engine, the flow of heating air is insufficient for many purposes, for example the windows and particularly the windshield of the motor vehicle will quickly freeze up in winter. Also, the air movement within the vehicle during this period is correspondingly small and unpleasantly noticeable, particularly when driving in cities and heavy slow traffic.

SUMMARY OF THE INVENTION

It is an object of the present invention to provide a satisfactory passenger heating system for motor vehicles wherein the above disadvantages are overcome with a simple economical construction requiring a minimum of space.

According to the present invention, the blower is provided with a shiftable shroud for controlling the volume of air delivered by the blower by altering the effective width of the blower blades. The shroud is selectively shifted according to the effective position of the valve controlling the flow in the heating air duct leading to the passenger compartment. By this means, the normal delivery of heating air and consequently the power requirement of the blower is kept small. With the exception of starting the heating of the passenger compartment of the motor vehicle, the power required by the blower is increased by enlarging the effective width of the blower impeller that is the blower blades, whereby the increased demand of air is economically satisfied. A simple and economical linkage is provided for controlling the shiftable shroud and in accordance with control of the valve. The valve may be arranged so that when the flow of air is completely shut off to the passenger compartment, heated air will be directly discharged to the atmosphere.

As mentioned above, the volume or quantity of heated air delivered by the prior art blower will be insufficient to satisfy normal requirements at low rotational speeds of the internal combustion engine. At high rotational speeds of the internal combustion engine, the quantity of heated air delivered will be sufficient, but many times the quantity and prior requirements will be excessive. According to the present invention, speed responsive means, more particularly centrifugal governor, is provided to shift the shiftable shroud in dependence upon the rotational speed of the blower, which may be driven by the internal combustion engine. By this means, the largest possible blade width for the delivery of air is provided for low rotational speeds and at high rotational speeds, the effective width of the blower blades is reduced to what might be considered its normal dimension. Thus, an optimum power requirement for the blower is obtained throughout the entire rotational speed range and at the same time the effectiveness of the heating air delivery is improved. The centrifugal governor influences the blower by super position of its control movement with the control movement of the valve linkage; a simple construction for carrying this out comprises an elastic member, for example a spring, that is interposed in the drive shifting train of the linkage so that the centrifugal governor shifts the shiftable shroud against the bias of this elastic member. Preferably, the centrifugal governor is directly driven by the shaft of the blower blades.

Further objects, features and advantages of the present invention will become more clear from the following detailed description of a preferred embodiment with reference to the accompanying drawing, in which:

FIGURE 1 is somewhat schematical partial longitudinal cross sectional view through the rear portion of a motor vehicle having an air-cooled internal combustion rear engine and heating-cooling blower according to the present invention;

FIGURE 2 is a partial top view of the device according to FIGURE 1; and

FIGURE 3 is an enlarged partial cross sectional view of a portion of FIGURE 1.

DETAILED DESCRIPTION

As shown in FIGURE 1, the motor vehicle 1 is provided with an air-cooled internal combustion engine 2 having a crankshaft (not shown) for driving the cooling air blower 3 through a V-belt drive 4. The radial flow blower 3 delivers cooling air into a manifold 5 where it is divided and conducted to the individual cylinders of the internal combustion engine for cooling purposes as well as directly into a duct 6.

The internal combustion engine according to the preferred embodiment is constructed as a "Boxer" type of engine having opposed rows of cylinders. The exhaust pipes 7, 8 of each cylinder row, respectively, conduct exhaust gases through heat exchangers 9, 10, respectively, prior to discharge of the exhaust gases into an exhaust muffler 11. Fresh air from the blower 3 may be conducted to the heat exchangers 9, 10 from the duct 6 by means of connecting ducts 12. The fresh air heated by the heat exchangers 9, 10 is discharged into the heating air conduits 13, 14 that lead to the passenger compartment. The flow of heating air through the conduits 13, 14 is controlled by means of valves 15, 16, respectively, that are substantially identical. For example, the valve 16 is provided with a rotatable flap 17 for controlling the cross section of conduit 14 for conducting heating air to the passenger compartment and also controls the opening and closing of an aperture 18 leading directly to the atmosphere that has a smaller flow cross sectional area than the conduit 14. When the flap 17 closes the conduit 14 leading to the passenger compartment, the aperture 18 is opened so that a smaller amount of air flows through the heat exchanger 10 even when the passenger compartment is not supplied with heating air.

Selective valve operation by means of the cable line 19 will rotate the flap 17 from its above-mentioned position to close the aperture 18 and open the conduit 14 for conducting heating air to the passenger compartment. Since the aperture 18 is closed, the full flow of air is delivered to the passenger compartment. If no further structure were provided, the flow of heating air to the passenger compartment would be dependent upon the rotational speed of the blower 3 and in the specific illustration upon the rotational speed of the internal combustion engine so that during idling, slow speeds and medium speeds of the internal combustion engine there would be insufficient quantities of heating air delivered to the passenger compartment.

In order to avoid the above-mentioned problem, the cable line 19 is, according to the present invention, connected with a device that increases the quantity of air delivered by the blower, when heating the passenger compartment. Additionally, the device is provided with a speed responsive control for decreasing the quantity of air delivered by the blower in dependence upon an increase in the rotational speed of the blower to provide an optimum favorable power demand for the blower.

The device for regulating the quantity of air delivered by the blower works according to the known principle of changing the effective width of the blower. The blower 3 includes a blade 20 that is drivingly attached to the drive shaft 21. The shaft 21 is drivingly connected to a belt pulley 22 of the V-belt drive 4. The driven blade 20 is within a suitable fixed housing 23 that enlarges into a spiral casing 24 leading to the air dividing manifold 5.

A sleeve 25 is axially slideable upon the shaft 21 and has a shroud shiftable plate 26 fixedly secured thereto. The shroud or plate 26 is provided with radially extending slots 27 for receiving therethrough the individual blades 28 of the blower blade 20. Above the outer edge 29 of the blades 28, the plate 26 is provided with a continuous annular flange 30 having opposed portions generally parallel to the outer edges 29 of the blades. Shaft 21 is provided with a shifting member or socket 31 that is connected with the forked end of a lever 32 that is pivotally mounted at its mid position and connected at its opposite end to a cable line 33. The cable line 33 is connected to the cable line 19 that operates the air flow valves, as shown in FIGURE 2. Axial shifting of the socket 31 will axially shift the sleeve 25 through the inter position of the coil spring 34 to thus correspondingly shift the plates 26. The spring 34 serves as an elastic intermediate member and is inserted loosely between the members 25 and 31; however, it is also possible to connect the spring 34 form-closingly with the members 25 and 31 so that axial movements of the sleeve 25 are positively effected by the shifting socket 31.

In the ineffective space between the blade 20, the sleeve 25 and the plate 26, there is mounted a centrifugal governor 35 that is secured for rotation with the blower blade 20. The weighted pivotal arms 36 will axially shift the sleeve 25 at relatively high rotational speeds.

The position of the elements that are shown in the various figures corresponds to the operation of the internal combustion engine at low speeds without the passenger compartment being heated. The effective width of the blower blades that is not covered by the shroud plate 26 supplies fresh air for cooling the internal combustion engine and a negligible small portion of air that is discharged directly into the atmospheer through the conduits 13, 14 and the apertures 18. When heating of the passenger compartment is desired, the flaps 17 of the valves 15, 16 are actuated by means of the cable line 19 and at the same time the cable line 33 and lever 32 shift the socket 31 on the shaft 21 to the right to correspondingly shift the sleeve 25 and plate 25 through the resilient driving connection of the spring 34, as shown in the figures. With shifting of the plate 26 to the right, the effective width or surface of the blades 28 is increased and the quantity of the air delivered by the blower is correspondingly increased. By this means, the quantity of heating air delivered by the blower is increased despite the relatively slow rotational speed of the blower.

If the rotational speed of the blower 3 is increased, the centrifical governor 35 becomes operative to shift the sleeve 25 together with the plate 26 by means of the weighted arms 36 against the bias of the spring 34 toward the left, in the figures; during this shifting, the socket 31 remains in its previously adjusted position and the spring 34 is compressed. As soon as the rotational speed of the blower again drops, the governor returns to its original position that is shown in the figures and the spring 34 shifts the sleeve 25 to the right corresponding to the control movement. The process will automatically repeated itself between the original position shown in the drawing wherein the heating compartment is not heated and the above-mentioned controlled positions.

While the above-mentioned preferred embodiment has been shown and described in detail for purposes of illustrating the specific narrow aspects of the invention and the broader aspects of the invention, further embodiments, variations and modifications are contemplated within the spirit and scope of the present invention as defined by the following claims. For example, the broader aspects of the present invention could be employed with a blower provided solely for heating air in association with a liquid-cooled engine. Also, instead of axially shifting the plate 26, the housing or blower casing may be axially shifted. Also, the blades of the blower may be separated and fastened to a rotationally stationary and axially slideable support plate.

I claim:

1. A heating arrangement for a motor vehicle having a passenger compartment, comprising: a heating air conduit opening into the passenger compartment; a heat exchanger for heating air; air blower means having blade means for supplying air through said heat exchanger to said air conduit for providing heating air to the passenger compartment of the motor vehicle; valve means for controlling the flow of heating air in said heating air conduit; selective means for controlling said valve means; said air blower having shiftable means for controlling the quantity of air delivered by shifting to selectively vary the effective width of the blower blade means; said selective means shifting said shiftable means in correspondence with control of said valve means.

2. The heating arrangement according to claim 1, including an air-cooled internal combustion engine and means for conducting air from said blower means to cool said internal combustion engine; wherein said selective means consists essentially of a single linkage interconnecting said valve means and said shiftable means.

3. The heating arrangement according to claim 2, including speed responsive means for shifting said shiftable means in correspondence with the rotational speed of said blade means.

4. The heating arrangement according to claim 3, wherein said selective means includes a shifting drive train having a resilient spring therein; said speed responsive means shifting said shiftable means in opposition to and having the magnitude of its shifting determined by the bias of said spring.

5. The heating arrangement according to claim 4, wherein said speed responsive means is a centrifugal governor.

6. The heating arrangement according to claim 5, wherein said blade means has a rotatable drive shaft and said centrifugal governor is directly connected on said shaft.

7. The heating arrangement according to claim 1, including speed responsive means for shifting said shiftable means in correspondence with the rotational speed of said blade means, wherein said speed responsive means superimposes its shifting of said shiftable means with respect to the control by said selective means.

8. The heating arrangement according to claim 7, wherein said selective means includes a shifting drive train having a resilient spring therein; said speed responsive means shifting said shiftable means in opposition to and having the magnitude of its shifting determined by the bias of said spring.

9. The heating arrangement according to claim 3, wherein said speed responsive means is a centrifugal governor.

10. The heating arrangement according to claim 9, wherein said blade means has a rotatable drive shaft and said centrifugal governor is directly connected on said shaft.

11. The heating arrangement according to claim 9, wherein said blade means has a rotatable drive shaft and said centrifugal governor is directly connected on said shaft.

References Cited

UNITED STATES PATENTS

| 2,316,421 | 4/1943 | Hans. | |
| 3,325,100 | 6/1967 | Fairbanks | 237—2A |

FOREIGN PATENTS

| 205,642 | 10/1959 | Austria. |
| 364,732 | 12/1922 | Germany. |
| 929,296 | 6/1955 | Germany. |
| 324,492 | 11/1957 | Switzerland. |

EDWARD J. MICHAEL, Primary Examiner

U.S. Cl. X.R.

237—14